United States Patent [19]
Dale

[11] Patent Number: 5,605,115
[45] Date of Patent: Feb. 25, 1997

[54] TUBULAR AQUARIUM SYSTEM

[76] Inventor: Stephen M. Dale, 2592 Bay Settlement, Green Bay, Wis. 54311

[21] Appl. No.: 418,940

[22] Filed: Apr. 7, 1995

[51] Int. Cl.⁶ .................................................. A01K 63/00
[52] U.S. Cl. ............................................................ 119/249
[58] Field of Search ................................. 119/247, 249, 119/250, 253, 224, 225

[56] References Cited

U.S. PATENT DOCUMENTS

| D. 238,687 | 2/1976 | Braid | D30/2 |
|---|---|---|---|
| D. 243,703 | 3/1977 | Gamble | D30/2 |
| 1,576,462 | 3/1926 | Polzin . | |
| 2,117,616 | 5/1938 | Levenstein | 273/86 |
| 2,657,927 | 11/1953 | Pease | 272/4 |
| 3,255,731 | 6/1966 | Girard | 119/224 |
| 3,903,844 | 9/1975 | Greenia | 119/250 |
| 3,921,583 | 11/1975 | De Shores | 119/250 |
| 5,005,521 | 4/1991 | Strong . | |
| 5,067,439 | 11/1991 | Hand | 119/249 |
| 5,140,941 | 8/1992 | Takakuwa | 119/224 |

FOREIGN PATENT DOCUMENTS 5-41933  2/1993  Japan ................................. 119/224

*Primary Examiner*—Todd E. Manahan
*Attorney, Agent, or Firm*—Andrus, Sceales, Starke & Sawall

[57] ABSTRACT

An aquarium system is provided for displaying marine life. The aquarium includes a reservoir for receiving water therein, the water in the reservoir defines a reservoir water level. A tank is positioned above the reservoir also for receiving water therein. The water in the tank defines a tank water level such that the reservoir water level is below the tank water level. A fish display tube provides a habitat for the marine life and has first and second ends communicating with the water in the tank. A return tube includes a first end coupled to and communicating with the fish display tube, and a second end communicating with the reservoir such that a syphon on the second end of the return tube draws water from the tank, through the fish display tube and the return tube, into the reservoir. Means are provided for pumping water from the reservoir into the tank to prevent the overflow of water in the reservoir.

14 Claims, 2 Drawing Sheets

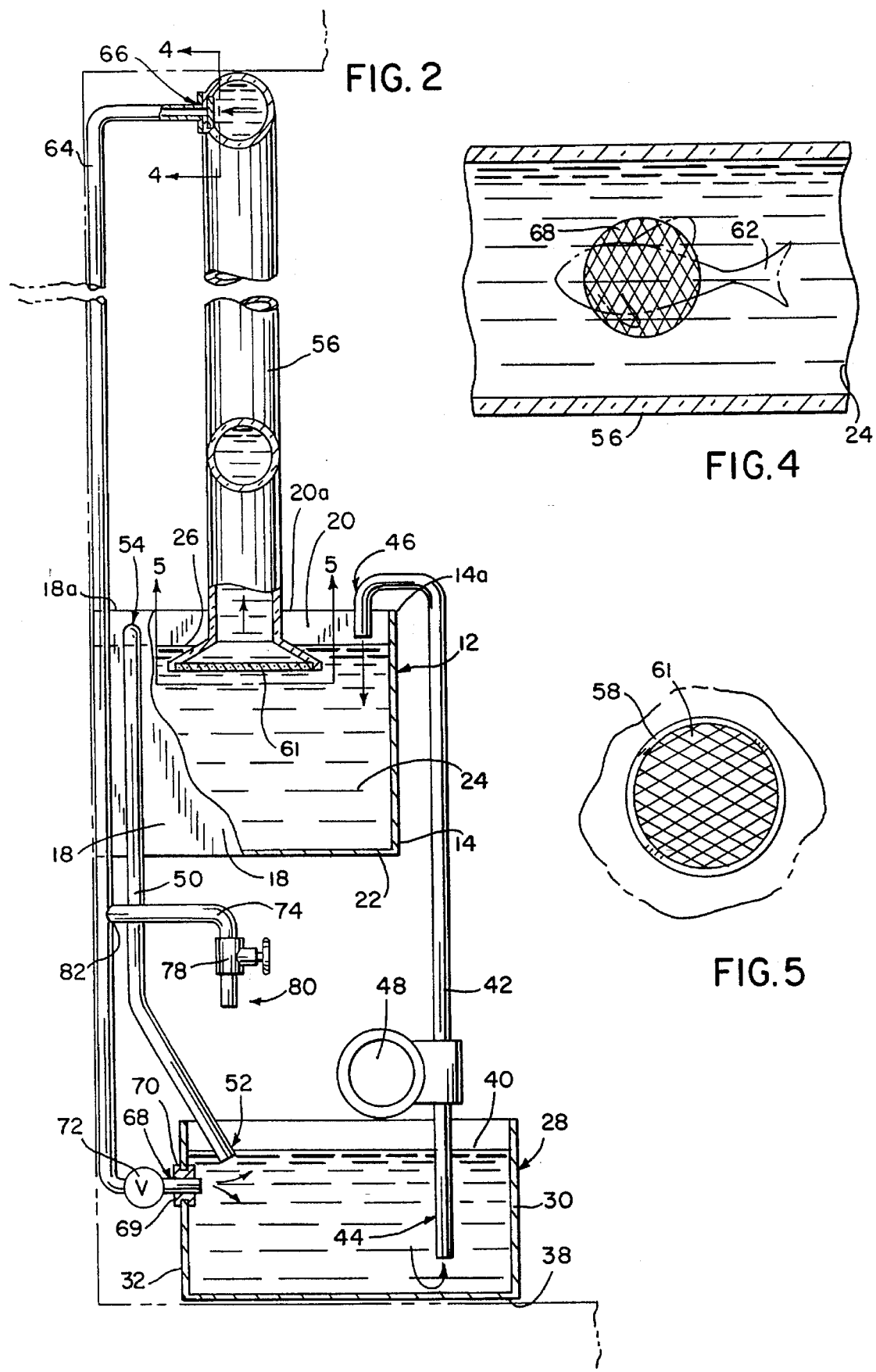

TUBULAR AQUARIUM SYSTEM

BACKGROUND AND SUMMARY OF THE INVENTION

The present invention relates generally to an aquarium system, and in particular, to an aquarium system which utilizes a syphon to circulate water through a tube which provides a habitat for marine life therein.

Prior art aquariums generally are limited to a single display tank positioned on an aquarium stand or the like. While various sizes and shapes of aquarium tanks have been previously constructed, large tanks are difficult and expensive to manufacture. In addition, recirculating the water in large aquariums requires the additional expenses of enhanced equipment and of increased electrical usage.

Therefore, It is a primary object and feature of the present invention to provide a visually aesthetic aquarium system for large vertical surfaces, such as walls and the like.

It is a further object and feature of the present invention to provide an aquarium system which is simple to assemble and easy to maintain.

It is still another object and feature of the present invention to provide an aquarium system which may be operated &n a cost efficient manner.

An aquarium system is provided for marine life. The aquarium includes a reservoir for receiving water therein. The water in the reservoir defines a reservoir water level. A tank is positioned above the reservoir also for receiving water therein. The water in the tank defines a tank water level such that the reservoir water level is below the tank water level.

The aquarium system further includes a fish display tube having first and second inlet ends. Each inlet end of the fish display tube communicates with the water in the tank. A return tube has a first end which is coupled to the fish display tube so as to allow water in the fish display tube two pass into the return tube. A second end of the return tube communicates with the reservoir such that a syphon on the second end of the return tube draws water from the tank, through the fish display tube and the return tube, into the reservoir. Means are provided for pumping water from the reservoir into the tank in order to prevent the overflow of water in the reservoir.

A fish inlet structure is positioned between the first and second inlet ends of the fish display tube. The inlet allows for introduction of the fish into the fish display tube. A screen is positioned over each end of the fish display tube in order to prevent fish in the display tube from exiting the display tube through the first or the second inlet end of the fish display tube and entering the tank. A screen is also positioned over a first end of the return tube in order to prevent the fish from exiting the fish display tube through the return tube.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 2 is a cross-sectional view of the aquarium system of FIG. 1 taken along line 2—2;

FIG. 4 is a cross-sectional view of a portion of the aquarium system of FIG. 2 taken along line 4—4; and FIG. 5 is a cross-sectional view of a portion of the aquarium system of FIG. 2 taken along line 5—5.

DESCRIPTION OF THE ILLUSTRATED EMBODIMENT

Figure 1:
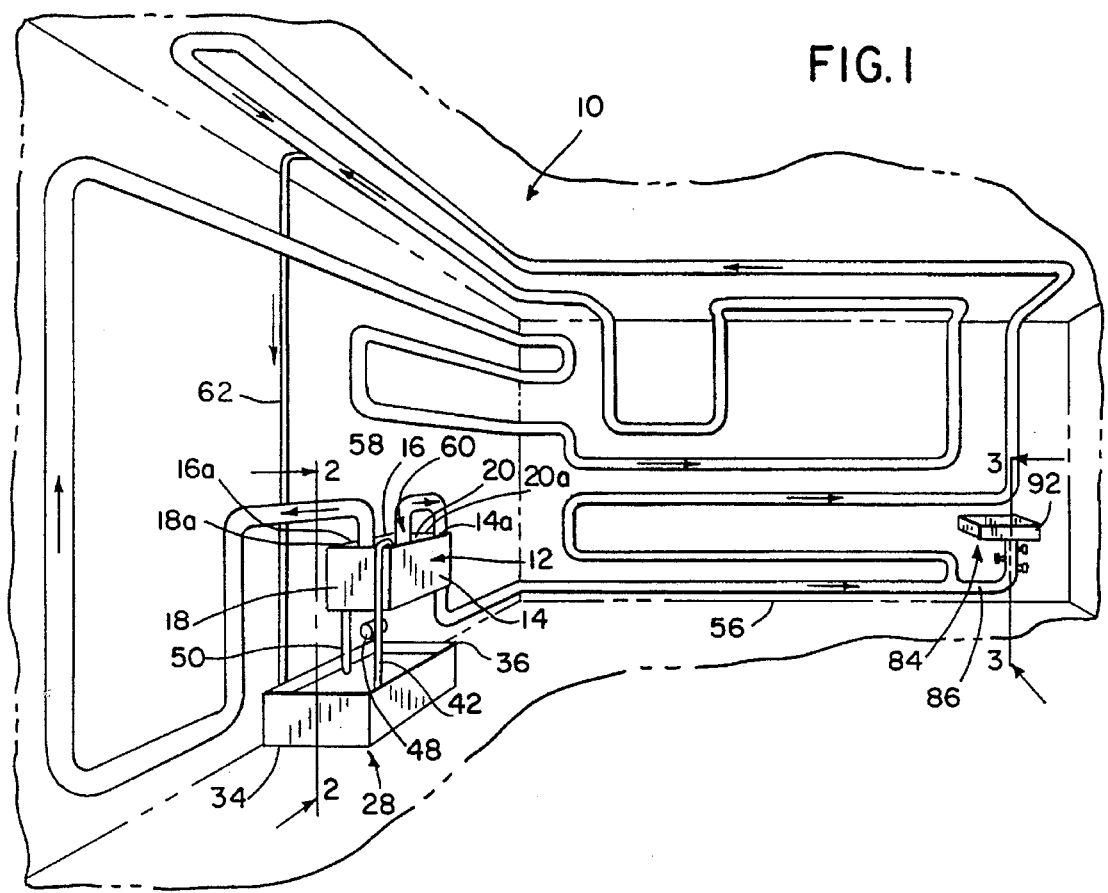
FIG. 1 is an isometric view of the aquarium system of the present invention.

Referring to FIG. 1, the aquarium system of the present invention is generally designated by the reference numeral 10. The aquarium system 10 includes a tank 12, FIGS. 1 and 2, having front and back glass sidewalls 14 and 16, and left and right glass sidewalls 18 and 20 bonded to each other along their corners and to a bottom wall 22. Tank 12 is adapted for receiving water 24 therein. Water 24 in tank 12 defines a water level 26 therein.

A reservoir 28 is also provided. Reservoir 28 includes front and back sidewalls 30 and 32, and left and right sidewalls 34 and 36 bonded to each other along the corners and to a bottom wall 38. Reservoir 28 is adapted to receive water 24 therein, and filter the water 24 therein, as is conventional. Water 24 in reservoir 28 defines a reservoir water level 40. Reservoir 28 is positioned with respect to tank 12 such that the water level 40 in reservoir 28 is below the water level 26 in tank 12.

A tube 42 is positioned between reservoir 28 and tank 12. Tube 42 has a first inlet end 44 positioned in reservoir 28, and a second outlet end 66 positioned in tank 12 so as to define a flowpath therebetween. In order to present the overflow of water 24 in reservoir 28, the water pump 48 draws excess water 24 in reservoir 28 through the first inlet end 44 of tube 42 and, pumps water 24 out outlet end 46 of tube 42 into tank 12, as is conventional.

An overflow tube 50 is also positioned between tank 12 and reservoir 28 such that a first end 52 of overflow tube 50 is received within reservoir 28 and a second end 54 of overflow tube 50 is positioned in tank 12 between a predetermined maximum water level in tank 12, and the top 57 of tank 12 as defined by the upper edges 14a, 16a, 18a and 20a of sidewalls 14, 16, 18 and 20, respectively.

In operation, if the water level 26 in tank 12 exceeds the predetermined maximum water level and approaches the top 57 of tank 12, water 24 will enter the second end 54 of overflow tube 50 and drain into a reservoir 28 through overflow tube 50 by means of gravity. This, in turn, prevents tank 12 from overflowing.

A fish display tube 56 is provided for receiving the flow of water therein and includes first and second inlet ends 58 and 60 which are positioned in tank 12 below the water level 26 therein. As best seen in FIG. 4, fish display tube 56 is adapted for receiving water 24 therein, such that the interior of fish display tube 56 provides a habitat for the marine life to be displayed in the aquarium system 10 of the present invention. While FIG. 1 shows a possible configuration of fish display tube 56, other shapes and configurations, however, are contemplated for the fish display tube 56 and therefore, the present invention is not limited to the configuration of fish display tube 56 as shown in FIG. 1.

As seen in FIG. 5, a screen 61 is placed over each inlet end 58 and 60 of fish display tube 56. Each screen 61 allows water 24 to pass therethrough, but prevents any marine life, such as fish 62, FIG. 4, in fish display tube 56 from entering into tank 12 through ends 58 and 60 of fish display tube 56.

Referring to FIG. 2, in order to allow water 24 in fish display tube 56 to circulate through the filter in reservoir 28, a return tube 64 is provided to create a flowpath between fish display tube 56 and reservoir 28. Return tube 64 includes a first end 66 coupled to fish display tube 56 to allow water 24 in fish display tube 56 to flow into return tube 64. It is highly desirable for first end 66 of return tube 64 to be coupled to the uppermost section of fish display tube 56, as shown in FIG. 1, to insure adequate circulation of water in fish display tube 56, and may be coupled to the center of fish display tube 56 to prevent lopsided circulation.

A fish screen 68 is placed over first end 66 of return tube 64 to prevent any marine life or fish 62 in fish display tube 56 from entering return tube 64 through first end 66 while allowing the flow of water therethrough.

A second end 68 of return tube 64 extends through an opening 69 in sidewall 32 of reservoir 28 so as to communicate with the interior of reservoir 28. A seal 70 is placed about second end 68 of return tube 64 in opening 69 to prevent water 24 from exiting reservoir 28 through opening 69.

A valve 72 is positioned between the first end 66 and the second end 68 of return tube 64. Valve 72 is rotatable between a first open position wherein water 24 is allowed to flow through valve 72, and a second closed position wherein water 24 is not allowed to flow through valve 72, as is conventional.

A branch tube 74 is coupled to return to 64 at a level between the bottom wall of tank 12 and valve 72. A valve 78 is positioned between end 80 of branch tube 74, and the junction 82 of branch 74 with return tube 64. Valve 78 is rotatable between a first open position wherein water 24 is allowed to flow through the valve 78, and a second closed position wherein water 24 is not allowed flow through valve 78, as is conventional.

In operation, valve 72 is rotated to the closed position so that no water 24 flows through valve 72, and valve 78 is rotated to its open position to allow water 24 to flow through valve 78. A vacuum is placed on end 80 of branch tube 74 to create a siphon which draws water 24 from tank 12 into fish display tube 56 through inlet ends 58 and 60. As water 24 fills fish display tube 56, the siphoning force of the vacuum draws water 24 into first end 66 or return tube toward the vacuum at end 80 of branch tube 74. The flowpath of water 24 is designated by the arrows in FIG. 1.

As water 24 flows through return tube 64 toward branch 76, valve 72 is rotated to the open position to create a flow path for water 24, and valve 78 is rotated to the closed position and the vacuum at end 80 is removed. As a result, water 24 will pass through valve 72 and into reservoir 28. As is known, the siphoning process will continue unabated as long as second end 68 of return tube 64 remains lower than the first and second ends 58 and 60 of the fish display tube 56, and the first and second inlet ends 58 and 60 remain below water level 26 in tank 12. The siphoning process, as heretofore described, allows water 24 to circulate through fish display tube 56, and thereafter be filtered in reservoir 28, before reentering the fish display tube 56. As described, fish display tube 56 will continually be filled with filtered water 24, thereby providing a superior environment and habitat for fish and other marine life.

In order to prevent the overflow of water 24 in reservoir 28, and in order to insure the water level 26 in tank 12 is maintained above the first and second inlet ends 58 and 60 of fish display tube 56 received in tank 12, pump 48 pumps water from reservoir 28 to tank 12, as previously described. Pump 48 supplies enough water 24 into tank 12 from reservoir 28 so that first and second inlet ends 58 and 60 of fish display tube 56 are always maintained below water level 26 in tank 12. If pump 48 supplies water 24 to tank 12 faster than the water 24 is syphoned out of tank 12, the water level 26 will rise toward the top 57 of tank 12. As water 24 approaches the top 57 of tank 12, the water 24 enters outlet tube 50 through second end 54 and flow, by means of gravity, through outlet tube 50 and back into reservoir 28 through first end 52 of outlet tube 50.

Figure 3:
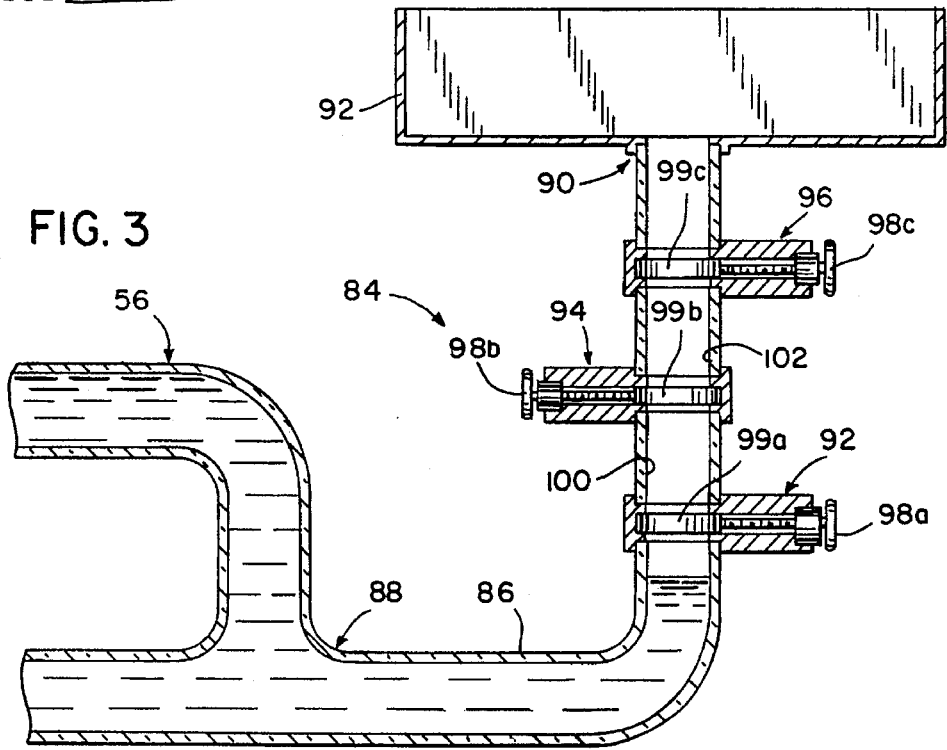
FIG. 3 is a cross-sectional view of a portion of the aquarium system of FIG. 1 taken along line 3—3.

Referring to FIG. 3, in order to introduce fish 62 or other marine life into the aquarium system 10 of the present invention, a fish introduction structure 84 is provided. Fish introduction structure 84 includes a tube 86 having a first end 88 coupled to a portion of fish display tube 56, and a second end 90 positioned above first end 88 of tube 86. The second end 90 of tube 86 opens into a fish introduction pan 92. Fish introduction pan 92 must be positioned below the uppermost portion of fish display tube 56.

A series of locks 92, 94 and 96 are spaced between the first end 88 and the second end 90 of tube 86. Each lock 92, 94 and 96 includes a valve 98a, 98b and 98c, respectfully, and a corresponding gate 99a, 99b and 99c. Each valve 98a, 98b and 98c is rotatable between a first position which opens the corresponding gate and allows water 24 to pass therethrough, and a second position which closes the corresponding gate and does not allow water 24 to pass therethrough.

As described, tube 86 defines a flow path from fish display tube 56 to fish introduction tray 92. A first transfer zone 100 is defined between gate 99a and 99b of locks 92 and 94, respectively. Similarly, a second transfer zone 102 is defined between gate 99b and 99c of locks 94 and 96, respectively.

In operation, each valve 98a, 98b, and 98c, is rotated to the first position to open gates 99a, 99b and 99c in locks 92, 94 and 96, respectively, and allow water 24 to flow from fish display tube 56 into fish introduction tray 92 through tube 86. When fish introduction tray 92 is substantially filled with water 24, valves 98a, 98b and 98c are rotated to the second position to close gates 99a, 99b and 99c and prevent the further flow of water 24 into fish introduction tray 92.

In order to introduce marine life into the aquarium system 10, the marine life or fish is deposited in fish introduction tray 92. Valve 98c of lock 96 is rotated to the first position to open gate 99c and allow any marine life in fish introduction tray 92 to enter second transfer zone 102 between locks 94 and 96. Once the marine life has entered second transfer zone 102, valve 98c is rotated to the second position to close gate 99c and prevent the marine life from returning to fish introduction tray 92.

With the marine life in the second transfer zone 102 and gate 99c of lock 96 closed, valve 98b of lock 94 is rotated to the first position to open gate 99b and allow marine life in the second transfer zone 102 to enter the first transfer zone 100. When the marine life enters into first transfer zone 100, valve 98b of lock 94 is rotated to the second position to close gate 99b and prevent the marine life from re-entering second transfer zone 102.

Once the marine life is within first transfer zone 100, valve 98a is rotated to the first position to open gate 99a and allow the marine life in first transfer zone 100 access to the fish display tube 56 through tube 86. Once the marine life has left first transfer zone 100, valve 98a of lock 92 may be rotated to the second position to close gate 99a.

As described, the marine life is introduced into the fish display tube 56 without interfering with the siphon required to circulate water 24, as previously described, and without allowing the water 24 in the fish display tube 56 to exit the aquarium system 10 through first introduction tray 92 of the fish introduction structure 84.

Introducing fish food into the fish display tube 56 may be accomplished using the same process as previously described with respect to introducing marine life into the aquarium system.

Various modes of carrying out the invention are contemplated as being within the scope of the following claims particularly pointing out and distinctly claiming the subject matter which is regarded as the invention.

I claim:

1. An aquarium system having water therein for displaying marine life, comprising:

a reservoir for receiving the water therein, the water in the reservoir defining a reservoir water level;

a tank positioned above the reservoir for receiving water therein, the water in the tank defining a tank water level such that the reservoir water level is below the tank water level;

a fish display tube having first and second inlet ends, each inlet end of the fish display tube communicating with the water in the tank;

a syphon including a return tube having a first end coupled to and communicating with the fish display tube, and a second end communicating with the reservoir such that the second end of the return tube draws water from the tank, through the fish display tube and the return tube, into the reservoir; and means for pumping water from the reservoir into the tank to prevent the overflow of water in the reservoir.

2. The aquarium system of claim 1 further comprising a fish inlet structure coupled to the fish display tube between the first and second inlet ends of the fish display tube, the inlet structure allowing for introduction of fish into the fish display tube.

3. The aquarium system of claim 2 further comprising a fish screen positioned over the first inlet end of the fish display tube for preventing fish in the fish display tube from entering the tank through the first inlet end in the fish display tube.

4. The aquarium system of claim 3 further comprising a second fish screen positioned over the second inlet end of the fish display tube for preventing fish in the fish display tube from entering the tank through the second inlet end of the fish display tube.

5. The aquarium system of claim 2 further comprising a fish screen positioned over the first end of the return tube for preventing fish in the fish display tube from entering the return tube.

6. An aquarium system having water therein for displaying marine life, comprising:

a tank having an interior for receiving the water therein;

a reservoir positioned below the tank having an interior;

first and second overflow tubes, each overflow tube having a first end communicating with the interior of the tank and a second end communicating with the interior of the reservoir;

a pump for pumping water from the reservoir to the tank through the first overflow tube so as to prevent the overflow of water in the reservoir;

a fish display tube having first and second inlet ends communicating with the interior of the tank; and a syphon including a return tube having an inlet end coupled to and communicating with the fish display tube, and a second end communicating with the interior of the reservoir such that water flows from the tank, into each inlet end of the fish display tube, through the fish display tube and into the inlet end of the return tube, through the return tube and into the reservoir through the second end of the return tube.

7. The aquarium system of claim 6 further comprising a fish inlet structure coupled to the fish display tube between the first and second inlet ends of the fish display tube, the inlet structure allowing for introduction of fish into the fish display tube.

8. The aquarium system of claim 7 further comprising a fish screen positioned over the first inlet end of the fish display tube for preventing fish in the fish display tube from entering the tank through the first inlet end in the fish display tube.

9. The aquarium system of claim 8 further comprising a second fish screen positioned over the second inlet end of the fish display tube for preventing fish in the fish display tube from entering the tank through the second inlet end of the fish display tube.

10. The aquarium system of claim 7 further comprising a fish screen positioned over the first end of the return tube for preventing fish in the fish display tube from entering the return tube.

11. An aquarium having water therein for displaying marine life, comprising:

a reservoir for receiving water therein, the water in the reservoir defining a reservoir water level;

a tank positioned above the reservoir for receiving water therein, the water in the tank defining a tank water level such that the reservoir water level is below the tank water level;

first and second overflow tubes, each overflow tube having a first end communicating with the tank and a second end communicating with the reservoir;

a pump for pumping water from the reservoir to the tank through the first overflow tube so as to prevent the overflow of water in the reservoir;

a fish display tube having first and second inlet ends, each inlet end of the fish display tube communicating with the water in the tank;

a syphon including a return tube having a first end coupled to communicating with the fish display tube, and a second end communicating with the reservoir such that the second end of the return tube draws the water from the tank, through the fish display tube and the return tube, into the reservoir; and a fish introduction structure positioned between the first and second inlet ends of the fish display tube, the inlet end allowing for the introduction of fish into the fish display tube.

12. The aquarium system of claim 11 further comprising a first fish screen over the first inlet end of the fish display tube for preventing fish from the fish display tube from entering the tank through the first inlet end of the fish display tube.

13. An aquarium system of claim 12 further comprising a second fish screen positioned over the second inlet end of the fish display tube for preventing fish in the fish display tube from entering the tank through the first inlet end of the fish display tube.

14. An aquarium system of claim 11 further comprising a fish screen positioned over the first end of the return tube for preventing fish in the fish display tube from entering the return tube.

* * * * *